United States Patent
Kim et al.

(10) Patent No.: US 10,972,931 B2
(45) Date of Patent: Apr. 6, 2021

(54) APPARATUS AND METHOD FOR CONTROLLING DATA TRANSMISSION IN COMMUNICATION SYSTEM

(71) Applicant: Samsung Electronics Co., Ltd, Suwon-si (KR)

(72) Inventors: Jinhyoung Kim, Seongnam-si (KR); Sooyoung Jang, Suwon-si (KR); Hyunjoo Lee, Seoul (KR); Hakyung Jung, Suwon-si (KR); Jinho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 15/981,686

(22) Filed: May 16, 2018

(65) Prior Publication Data

US 2018/0338264 A1 Nov. 22, 2018

(30) Foreign Application Priority Data

May 16, 2017 (KR) ........................ 10-2017-0060412

(51) Int. Cl.
*H04W 28/02* (2009.01)
*H04L 12/24* (2006.01)
(Continued)

(52) U.S. Cl.
CPC ..... *H04W 28/0236* (2013.01); *H04L 41/0826* (2013.01); *H04L 43/0841* (2013.01);
(Continued)

(58) Field of Classification Search
CPC ... H94K 43/16; H04W 28/0236; H04L 47/27; H04L 41/0826; H04L 43/0841;
(Continued)

(56) References Cited

U.S. PATENT DOCUMENTS 9,391,911 B1 * 7/2016 Anderson ............. H04L 1/1628
2010/0161842 A1 * 6/2010 Shan ..................... G06F 1/3209
710/18
(Continued)

OTHER PUBLICATIONS

Franck Le et al., "Removing TCP Congestion Control on the Last Flop in Split TCP Environments", The 2016 International Workshop on Wireless Network Measurements and Experimentation, May 9-13, 2016, 8 pages.
(Continued)

*Primary Examiner* — El Hadji M Sall

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Disclosed is a method of operating a device in a communication system. The method includes: configuring a threshold parameter for data transmission/reception based on at least one of an application characteristic, a network utilization, and a network speed; and controlling data transmission/reception with a network based on the threshold parameter The threshold parameter is relevant to at least one of an amount of data, which can be received by the proxy device and an amount of data which can be transmitted by the proxy device.

12 Claims, 12 Drawing Sheets

(51) Int. Cl.
  *H04L 12/26*   (2006.01)
  *H04L 12/859*  (2013.01)
  *H04L 29/08*   (2006.01)
  *H04L 29/06*   (2006.01)
  *H04L 12/801*  (2013.01)
  *H04L 12/807*  (2013.01)
  *H04L 12/841*  (2013.01)

(52) U.S. Cl.
  CPC ........ *H04L 47/193* (2013.01); *H04L 47/2475* (2013.01); *H04L 67/28* (2013.01); *H04L 67/2842* (2013.01); *H04L 69/163* (2013.01); *H04L 43/0829* (2013.01); *H04L 43/0876* (2013.01); *H04L 43/16* (2013.01); *H04L 47/27* (2013.01); *H04L 47/283* (2013.01); *H04W 28/0273* (2013.01)

(58) Field of Classification Search
  CPC ............. H04L 47/2475; H04L 67/2842; H04L 47/283; H04L 67/28; H04L 43/0829
  See application file for complete search history.

(56) References Cited

U.S. PATENT DOCUMENTS

| | | | |
|---|---|---|---|
| 2013/0100955 A1 | 4/2013 | Dunlap et al. | |
| 2018/0219786 A1* | 8/2018 | Il | H04L 47/27 709/221 |

OTHER PUBLICATIONS

Jeffrey M. Jaffe, "Flow Control Power is Nondecentralizable", IEEE Transactions on Communications, vol. Com-29, No. 9, Sep. 1981, p. 1301-1306.

* cited by examiner

APPARATUS AND METHOD FOR CONTROLLING DATA TRANSMISSION IN COMMUNICATION SYSTEM

CROSS-REFERENCE TO RELATED APPLICATION(S) AND CLAIM OF PRIORITY

This application is based on and claims priority under 35 U.S.C. § 119 to Korean Patent Application No. 10-2017-0060412 filed on May 16, 2017, in the Korean Intellectual Property Office, the disclosure of which is incorporated by reference herein in its entirety.

BACKGROUND

1. Field

The present disclosure relates generally to a communication system, and more particularly to an apparatus and a method for controlling data transmission in a proxy environment.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G contemplates supporting various types of terminals. For example, discussion of a Fixed Wireless Access (FWA) scheme in which a device having low mobility or no mobility performs wireless communication with a wireless network Base Station (BS) has been conducted. The FWA may be used for connection of an Internet service within the home such as an office and a house, and in this case, conventional installation costs and efforts of the wired network can be reduced.

The above information is presented as background information only to assist with an understanding of the present disclosure. No determination has been made, and no assertion is made, as to whether any of the above might be applicable as a prior art with regard to the present disclosure.

SUMMARY

Based on the above discussion, embodiments according to the present disclosure provide an apparatus and a method for controlling data transmission in a communication system.

The present disclosure provides embodiments of an apparatus and a method for preventing a data transmission delay in a proxy environment.

The present disclosure provides embodiments of an apparatus and a method for controlling a configuration of a data transmission amount threshold parameter in consideration of at least one of an application characteristic and a network utilization in a proxy environment.

The present disclosure provides embodiments of an apparatus and a method for controlling a configuration of a data reception amount threshold parameter in consideration of a speed difference between networks connected to the device in the proxy environment.

In accordance with embodiments of the present disclosure, a method of operating a device in a communication system is provided. The method includes configuring a threshold parameter for data transmission/reception based on at least one of an application characteristic, a network utilization, and a network speed, and controlling data transmission/reception with a network based on the threshold parameter, wherein the threshold parameter is relevant to at least one of an amount of data, which can be received by the device and an amount of data which can be transmitted by the device.

In accordance with certain embodiments of the present disclosure, a device in a communication system is provided. The device includes at least one processor configured to configure a threshold parameter for data transmission/reception based on at least one of an application characteristic, a network utilization, and a network speed and control data transmission/reception with a network based on the threshold parameter, wherein the threshold parameter is relevant to at least one of an amount of data, which can be received by the device and an amount of data which can be transmitted by the device.

An apparatus and a method according to various embodiments of the present disclosure can increase a network utilization by controlling data transmission in consideration of an application and the network utilization in a proxy environment and improve the Quality of Experience (QoE) of users using the application at various requirement levels. Further, it is possible to reduce a delay and jitter while guaranteeing the same speed by controlling data transmission in consideration of a speed difference between sub-connections of both ends of a device.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and a method for controlling data transmission in a communication system. Specifically, the present disclosure provides a technology for controlling a transmission amount or reception amount threshold parameter in order to mitigate a data transmission delay in a proxy environment.

Terms referring to network entities used in the following description, terms referring to control information (for example, a congestion window (CWND), a receiver window (RWND), and the like), and terms referring to elements of the device are employed for convenience of description. Accordingly, the present disclosure is not limited to the following terms and other terms having the same technical meaning may be used.

Further, the present disclosure includes various embodiments using a $5^{th}$ Generation (5G) system and a Wi-Fi system, but these systems are only examples. Various embodiments of the present disclosure may be easily modified and applied to other communication systems.

Figure 1:
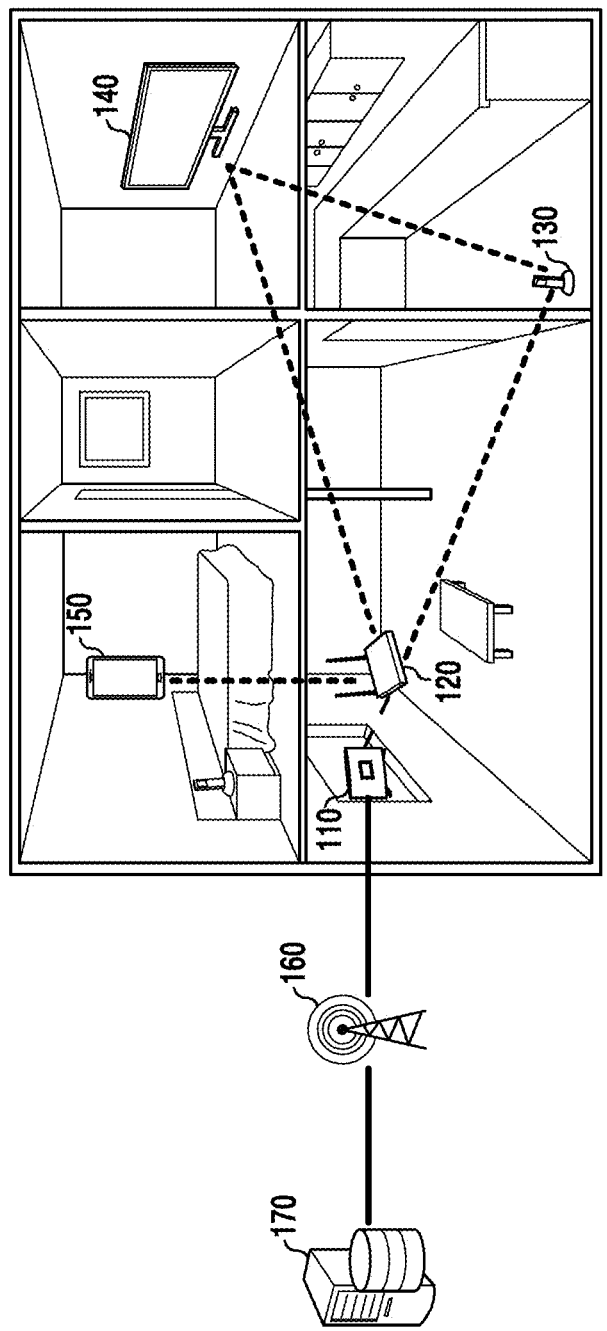
FIG. 1 illustrates a communication system according to various embodiments of the present disclosure.

FIG. 1 illustrates a communication system according to various embodiments of the present disclosure. Referring to the non-limiting example of FIG. 1, the system includes a proxy device 110, an Access Point (AP) 120, an Internet Protocol (IP) phone 130, an IP TV 140, a mobile device 150, a BS 160, and a server 170.

According to certain embodiments, proxy device 110 comprises a device which receives a request from one or more client devices (for example, the IP phone 130, the IP TV 140, and the mobile device 150) and relays data transmission from a server (for example, the server 170) as a relay device. The proxy device 110 may serve to relay a request for resources to the server to simplify and capsulate the structure of a distributed system and reduce service complexity. Accordingly, the proxy device 110 may relay packet transmission and reception of the IP phone 130, the IP TV 140, and the mobile device 150 to allow them to transmit and receive packets for receiving various application services (for example, download of Augmented Reality (AR), Virtual Reality (VR), a game, and a file) through the server 170. According to various embodiments, the proxy device 110 may be a stationary device. Further, the proxy device 110 may be a Fixed Wireless Access (FWA) device that receives wireless access from the BS 160. According to various embodiments, in an environment of replacing the conventional wired network with a wireless network (for example, an LTE wireless access network or a 5G wireless access network) to provide the Internet within the home, the proxy device 110 may be a device within the home for performing wireless communication with the BS of the wireless access network. The proxy device 110 may be a device combining functions of two or more of the above devices. According to various embodiments, the proxy device 110 may control data transmission by controlling a threshold parameter of the data transmission based on at least one of application characteristics (for example, a delay-sensitive service or not) for one or more client devices (for example, the IP device 130, the IP TV 140, and the mobile device 150), a network utilization, and a network speed difference in both ends of the proxy device 110.

AP 120 may be, for example, an AP configuring a Wi-Fi access network and process data traffic between the proxy device 110, the IP phone 130, the IP TV 140, and the mobile device 150. According to various embodiments, the AP 120 may be included in some function blocks of the proxy device 110. According to an embodiment, when the AP 120 and the proxy device 110 are implemented as separate devices, a connection between the AP 120 and the proxy device 110 may be based on a wireless interface (for example, Wi-Fi) or a wired interface.

The IP phone 130, the IP TV 140, and the mobile device 150 are client devices within the home that provide services such as a voice call, a bidirectional television service using an Internet network, and a voice/image call, respectively. The IP phone 130, the IP TV 140, and the mobile device 150 may be connected to the proxy device 110 through the AP 120 and transmit/receive data for various application services from the server 170 through the proxy device 110.

The BS 160 provides wireless access to the proxy device 110. The BS 160 is one of entities configuring the access network and has coverage including a predetermined geographical range. The BS 160 may be referred to as "Access Point (AP)", "evolved NodeB (eNB)", "$5^{th}$ Generation (5G) node", "wireless point", "Transmission/Reception Point (TRP)", or another term having an equivalent meaning thereto as well as "base station".

The server 170 is a device for providing various application services. The server 170 may operate independently from the BS 160. The server 170 may provide services for multimedia such as voices, audio signals, videos, and data based on an IP. The services may include VR, AR, and a game. One or more client devices (for example, the IP phone 130, the IP TV 140, and the mobile device 150) may transmit a request for resources to the server 170 through the proxy device 110.

Figure 2:
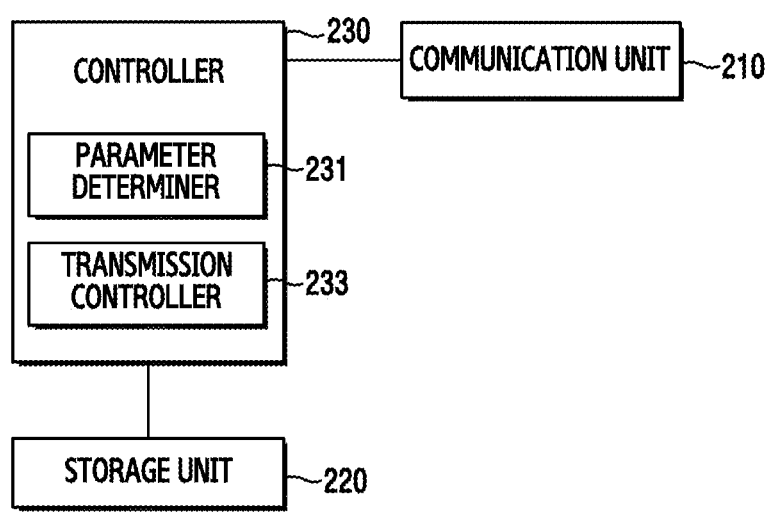
FIG. 2 is a block diagram illustrating a proxy device in a communication system according to various embodiments of the present disclosure.

FIG. 2 is a block diagram illustrating a proxy device in a communication system according to various embodiments of the present disclosure. The non-limiting example of FIG. 2 illustrates, without limitation, the configuration of the proxy device 110. The suffix "-unit" or "-er" used hereinafter may refer to a unit for processing at least one function or operation, and may be implemented as hardware, software, or a combination of hardware and software. As illustrated in FIG. 2, the proxy device includes a communication unit 210, a storage unit 220, and a controller 230.

The communication unit 210 may include at least one interface for transmitting and receiving signals between different nodes within the network or transmitting and receiving signals between nodes of different networks. That is, the communication unit 210 may convert a bitstream transmitted from the proxy device to another node, for example, an access node, a BS, or a core network into a physical signal and convert a physical signal received from another node to a bitstream. According to certain embodiments, the communication unit 210 may support two or more communication interfaces. For example, the communication unit 210 may support a first interface for accessing a wireless access network for communication with an external server and a second interface for providing an Internet connection to a particular space (for example, within the home). The first interface may be implemented as a wireless interface, and the second interface may be implemented as a wired or wireless interface.

For example, the communication unit 210 is a wireless interface and may include a wireless communication unit (not shown) that performs functions for transmitting/receiving signals through a wireless channel. The wireless communication unit performs a function for conversion between a baseband signal and a bitstream according to a physical layer standard of the system. For example, in data transmission, the wireless communication unit generates complex symbols by coding and modulating a transmission bitstream. Further, in data reception, the wireless communication unit reconstructs a reception bitstream by decoding and demodulating a baseband signal. Also, the wireless communication unit 710 up-converts a baseband signal into a Radio Frequency (RF) band signal and transmits the same through an antenna, and down-converts an RF band signal received through an antenna into a baseband signal. To this end, the wireless communication unit may include a transmission filter, a reception filter, an amplifier, a mixer, an oscillator, a Digital-to-Analog Convertor (DAC), an Analog-to-Digital Convertor (ADC), and the like. Further, the wireless communication unit may include a plurality of transmission/reception paths. In addition, the wireless communication unit may include at least one antenna array consisting of a plurality of antenna elements. On the hardware side, the wireless communication unit may include a digital unit and an analog unit, and the analog unit may include a plurality of sub-units according to operation power, operation frequency, and the like. According to various embodiments, the proxy device may interwork with the BS of the wireless access network through the wireless communication unit.

The communication unit 210 transmits and receives the signal as described above. Accordingly, the communication unit 210 may be referred to as a "transmitter", a "receiver", or a "transceiver". Also, the transmission and reception performed through a wireless or wired channel, which is described in the following descriptions, may be used as a meaning including the above-described processing performed by the communication unit 210.

According to various embodiments, storage unit 220 stores a basic program, an application, and data such as setting information for the operation of the proxy device. The storage unit 220 may be configured as volatile memory, non-volatile memory, or a combination of volatile memory and non-volatile memory. Further, the storage unit 220 provides stored data in response to a request from the controller 230.

According to the non-limiting example of FIG. 1 controller 230 controls the overall operations of the proxy device. For example, the controller 230 transmits and receives signal through the communication unit 210. Further, the controller 230 records data in the storage unit 220 and reads the recorded data. To this end, the controller 230 may include at least one of a processor or a micro-processor, or may be a part of the processor. Further, the relevant portion of the communication unit 210 or the controller 230 may be referred to as a Communication Processor (CP). Particularly, the controller 230 may configure a data reception amount threshold parameter of the proxy device or a data reception amount threshold parameter of the client device (for example, the IP phone 130, the IP TV 140, or the mobile device 150) and control data transmission according to various embodiments described below. To this end, the controller 230 may include a parameter determiner 231 and a transmission controller 233. Here, the parameter determiner 231 and the transmission controller 233 may be instructions/code at least temporarily residing in the controller 230, storage spaces storing the instructions/code, or the part of a circuitry constituting the controller 230 as an instruction set or code stored in the storage unit 220. For example, the controller 230 controls the proxy device to perform procedures according to various embodiments described below.

As the parameters of 5G standard become settled, innovation of autonomous vehicles, IoT, and wireless broadband fields are predicted through a speed at a gigabit level. Particularly, there is the discussion on a method of increasing the quality of experience of the user for various services through a high speed while decreasing excessive costs for wireless network installation in every house by providing Internet services within the home through 5G FWA based on a high speed of 5G. Further, a 5G system requires delay-sensitive services and interactive services such as VR and AR. Accordingly, in order to improve the Quality of Experience (QoE) of the user for real-time services of 5G, not only the speed but also the delay should be considered.

In a 5G FWA environment, since an unnecessary decrease in an end-to-end speed is generated due to a frequent home Wi-Fi loss, a need for Transmission Control Protocol (TCP) proxy increases to sufficiently use a 5G bandwidth. However, the conventional TCP method determines the Wi-Fi loss as congestion and causes a speed decrease. Further, the conventional TCP method aggressively transmits data without consideration of application characteristics and transmits data without consideration of a speed difference between the server and the proxy and between the proxy and the terminal, thereby resulting in a data transmission delay and deterioration of jitter. For example, according to an embodiment, a home Wi-Fi average TCP loss rate in U.S.A. is measured as 0.17%, and a proportion of the loss rate higher than or equal to 0.1% is measured as 22.1%. At this time, due to the aggressive transmission, a Round Trip Time (RTT) is measured to rise up to 150 ms in one hop. In an environment in which the W-Fi loss is frequently generated, the conventional TCP method aiming for the aggressive transmission may cause serious speed decrease and delay.

As described above, in order to improve the QoE of the user for delay-sensitive and interactive services such as VR, AR, and games, reducing a response delay and maintaining a proper delay level as well as simply improving a speed become important problems in 5G. Accordingly, the present disclosure proposes embodiments of a method of improving QoE of the user through a TCP design optimized for a TCP proxy environment in 5G FWA.

However, the present disclosure is not limited to the 5G service environment or the Wi-Fi environment. According to other embodiments, a method of controlling data transmission proposed by the present disclosure may be applied to all systems including a proxy environment providing delay-sensitive services in which a data transmission delay and jitter should be reduced.

As described above, the present disclosure proposes a method of controlling data transmission to reduce the data transmission delay and jitter. According to various embodiments of the present disclosure, operations for configuring an amount of data, which can be transmitted, and controlling data transmission in a proxy environment may be performed as illustrated through the non-limiting examples of FIGS. 3 to 8.

Figure 3:
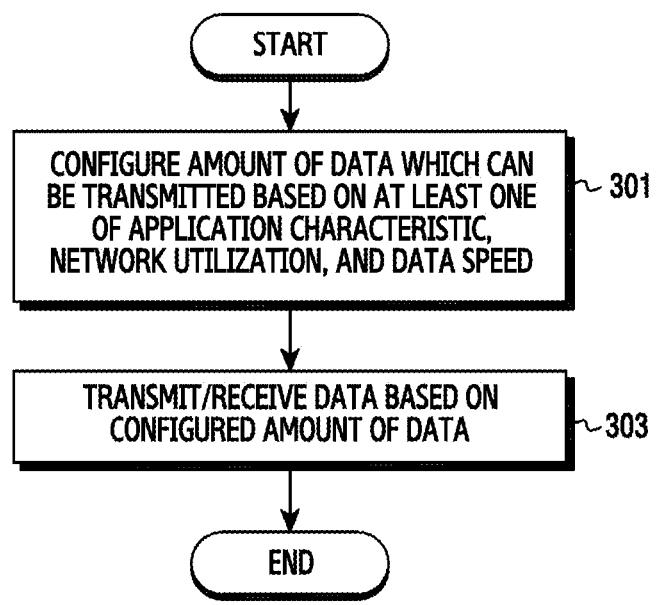
FIG. 3 illustrates operations of a method of operating a proxy device in a communication system according to various embodiments of the present disclosure.

FIG. 3 illustrates operations of a method of operating a proxy device in a communication system according to various embodiments of the present disclosure. Specifically, the non-limiting example of FIG. 3 illustrates an operation method of the proxy device 110.

Referring to FIG. 3, in step 301, the proxy device configures an amount of data which can be transmitted based on at least one of an application characteristic, a network utilization, and a data speed. For example, the proxy device may configure a parameter for the amount of data which can be transmitted based on at least one of the characteristic of the application triggering a current flow (for example, whether the application is sensitive to a delay or not), the network utilization (for example, a total sum of speed of flows), and the data speeds of respective networks on both ends of the proxy device. At this time, the parameter for the amount of data which can be transmitted may be at least one of a parameter for a transmission amount threshold of the proxy device and a parameter for a reception amount threshold of the client device (for example, the IP phone 130, the IP TV 140, or the mobile device 150).

Thereafter, in step 303, the proxy device performs data transmission/reception based on the configured amount of data which can be transmitted. According to certain embodiments, the proxy device may perform data transmission/reception based on at least one of the configured parameter for the transmission amount threshold of the proxy device and the configured parameter for the reception amount threshold of the client device (for example, the IP phone 130, the IP TV 140, or the mobile device 150). According to various embodiments, the proxy device may control transmission of data received from the server to the client device based on the parameter for the transmission amount threshold. According to other embodiments, the proxy device may transmit the parameter for the reception amount threshold of the client device to a server device (for example, the server 170) and transmit data received from the server device to the client device based on the reception amount threshold.

Figure 4:
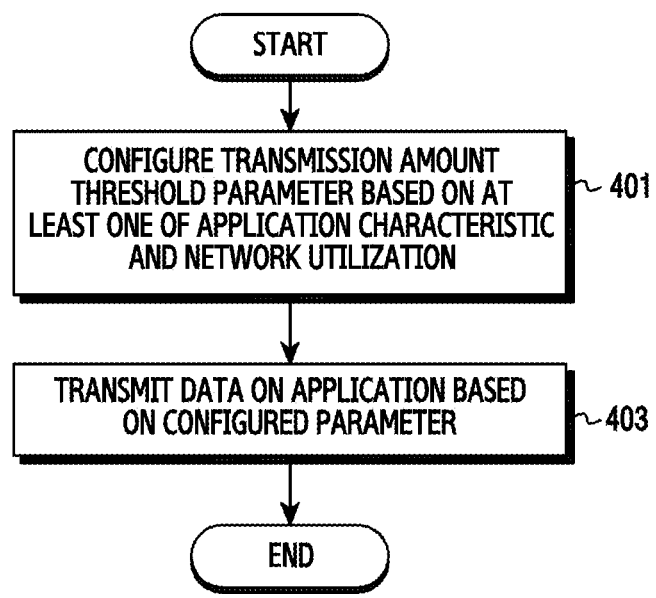
FIG. 4 illustrates a method of operating the proxy device for controlling a transmission amount threshold parameter in the communication system according to various embodiments of the present disclosure.

FIG. 4 illustrates operations of a method of operating a proxy device for controlling the transmission amount threshold parameter in a communication system according to various embodiments of the present disclosure. Specifically, the non-limiting example of FIG. 4 illustrates an operation method of a proxy device 110.

Referring to FIG. 4, in step 401, the proxy device configures a transmission amount threshold parameter based on at least one of an application characteristic and a network utilization. For example, the proxy device may configure the transmission amount threshold which can be transmitted without Acknowledgement (ACK) by the proxy device based on at least one of a characteristic of an application triggering a current flow (for example, whether the application is sensitive to a delay) and a network utilization (for example, a total sum of speeds of flows). For example, the transmission amount threshold parameter may be referred to as a "window" and a value of the transmission amount threshold parameter may be referred to as a "window size".

Thereafter, in step 403, the proxy device performs data transmission/reception of an application based on the configured transmission amount threshold parameter. According to some embodiments, the proxy device may perform data transmission/reception based on the configured parameter for the transmission amount threshold of the proxy device. For example, the proxy device may perform control to transmit data received from the server to the client device within a range smaller than the configured transmission amount threshold.

According to certain embodiments, in the TCP proxy environment, a TCP CUBIC method is used as a default TCP method of Linux. The TCP CUBIC may determine a Wi-Fi loss as a congestion loss and reduce the CWND which is an example of the transmission amount threshold parameter described with reference to FIG. 4, thereby unnecessarily deteriorating the speed. Here, the CWND refers to a limit of an amount of TCP data which can be transmitted through the network before Acknowledgement (ACK) is received. Further, the TCP CUBIC may deteriorate the delay and jitter due to aggressive transmission.

In connection with this, a method of not decreasing the CWND even when the loss is generated is proposed, by which reduction in throughput can be prevented. The proposed method has improved throughput compared to the conventional method, but there is no detailed description of a value fixed to the CWND. Since there is a trade-off between the speed and the delay according to the change in the CWND, the QoE of the user may be reduced in the application sensitive to the delay when the CWND is configured to be high. However, it is not possible to optimize transmission in consideration of the trade-off between the speed and the delay through a proposed distributed algorithm. The proposed method does not consider traffic in other client devices or traffic in other TCP flows within the corresponding client device. When the CWND is large, the number of lost packets increases when the loss is generated. At this time, if there is no other traffic, the large number of lost packets is not a problem. However, if there is other traffic, transmission of the traffic is interrupted, and thus a total speed decreases.

According to certain embodiments, a method of constructing a class for each application and applying routing according to each class is proposed. Since the proposed method controls only a bandwidth for an application, it does not consider a delay in connection with a transport layer. That is, the method does not consider an application in which the delay is more important than the speed, thereby having a limit in improving QoE. Further, the proposed method drops a packet to perform minimum bandwidth control without any mention of the generation of the loss. Accordingly, the proposed method may unnecessarily generate a speed decrease and thus generate a total speed decrease.

As described above, a method of solving the problem of the conventional scheme for fixing the CWND or controlling only the bandwidth for the application and improving the QoE of the user is proposed. Particularly, embodiments according to the present disclosure increase the wide use of the technology by presenting a transport layer optimizing method for improving the QoE of the user through only a modification of the proxy device without any modification of the server/terminal/application. According to various embodiments of the present disclosure, a detailed procedure for configuring the transmission amount threshold parameter of the proxy device may be performed as illustrated in FIGS. 5 to 6.

Figure 5:
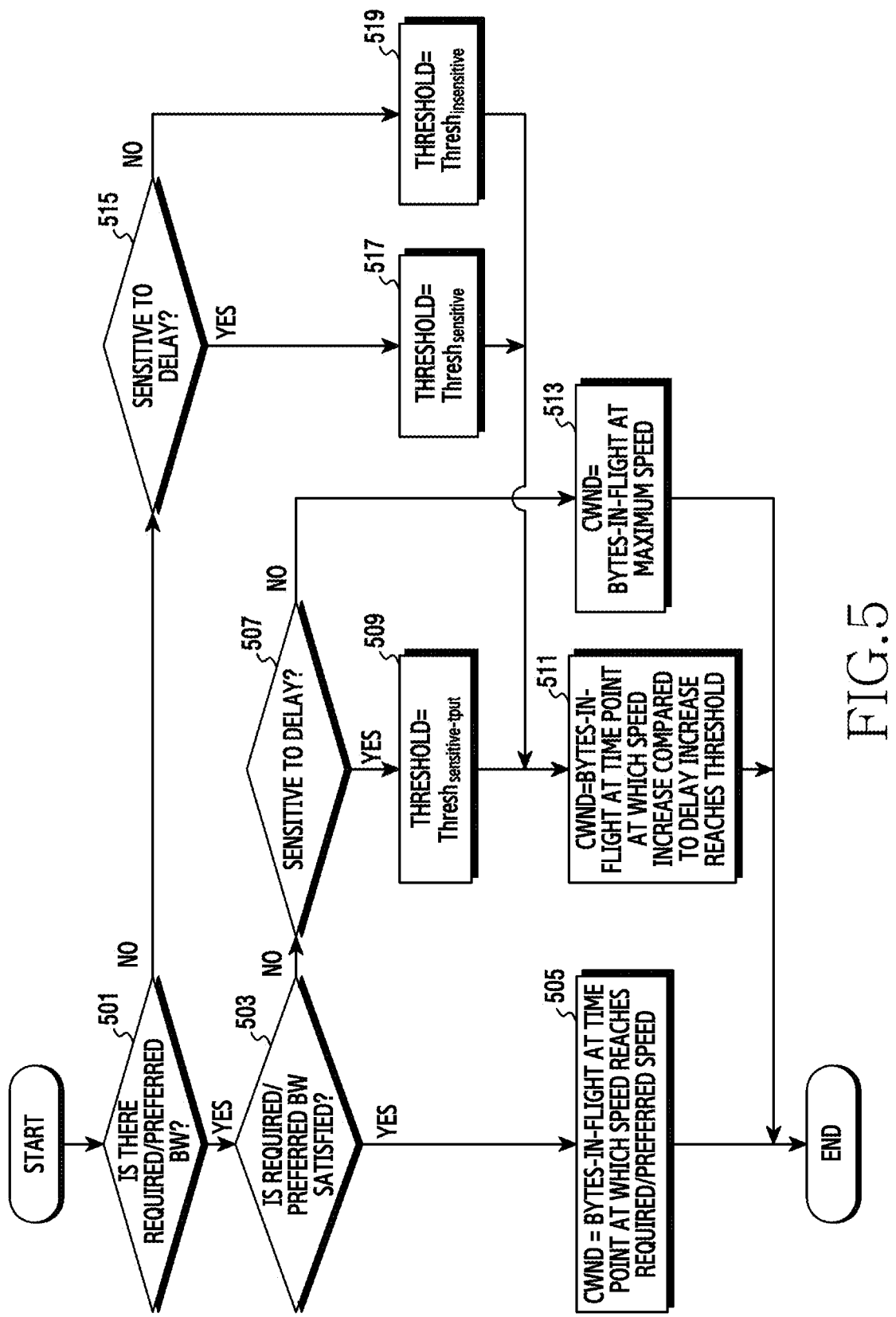
FIG. 5 illustrates operations of a method of operating a proxy device for controlling a transmission amount threshold parameter according to an application characteristic in a wireless communication system according to various embodiments of the present disclosure.
Figure 6:
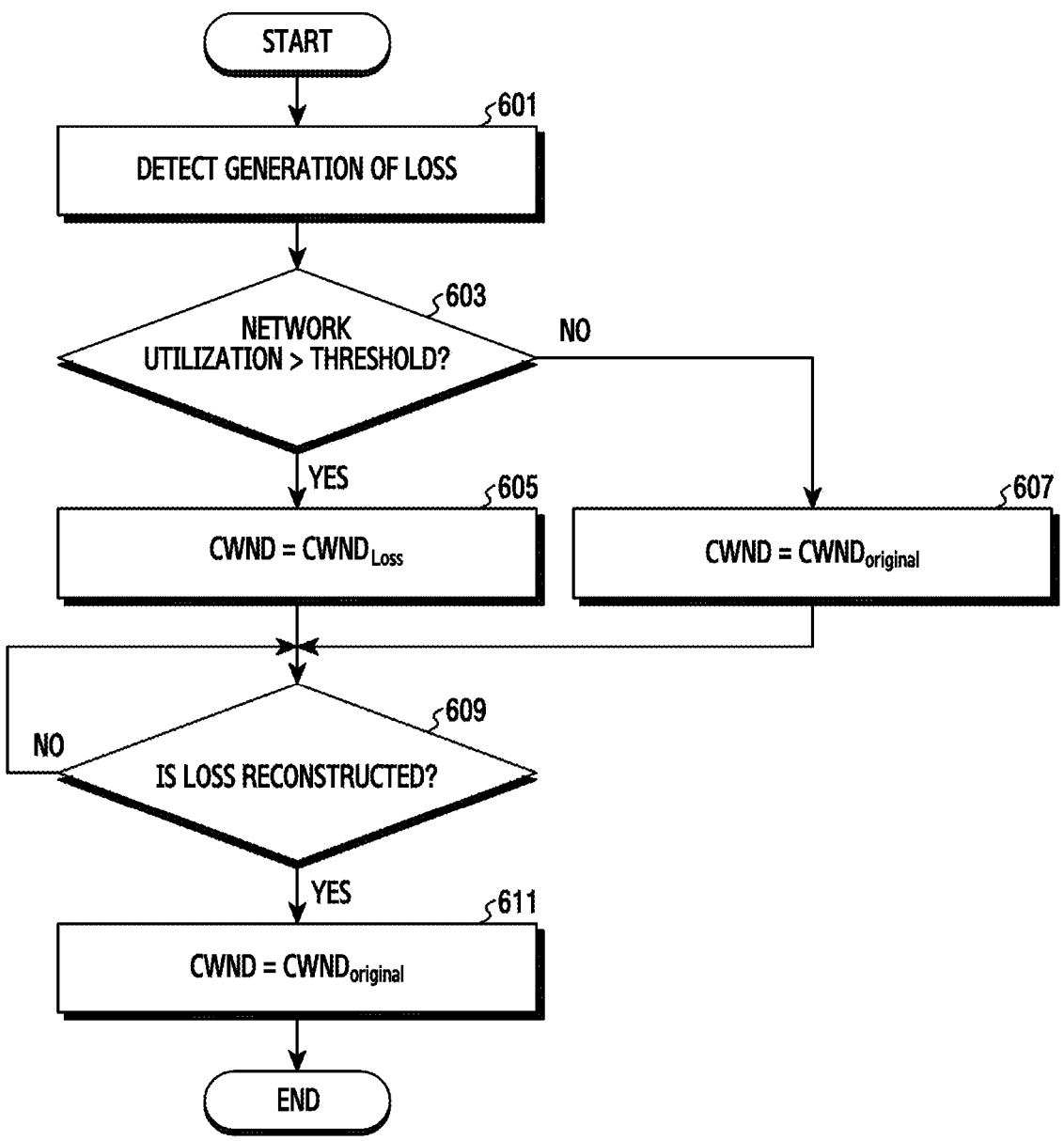
FIG. 6 illustrates operations of a method of operating the proxy device for controlling a transmission amount threshold parameter based on a network utilization when a loss is generated in a wireless communication system according to various embodiments of the present disclosure.

FIG. 5 illustrates operations of a method of operating the proxy device for controlling a transmission amount threshold parameter according to an application characteristic in the wireless communication system according to various embodiments of the present disclosure. FIG. 5 illustrates an operation method of the proxy device 110.

Referring to the non-limiting example of FIG. 5, in step 501, the proxy device determines whether there is a required/preferred bandwidth of an application. According to an embodiment, the proxy device identifies whether there is a required/preferred speed of an application triggering a started flow. The required speed is a speed which should be necessarily guaranteed for smooth performance of the application. The preferred speed is a speed which is not necessary when performing an application, but more satisfactory services can be provided to the user at the preferred speed or higher. For example, when image qualities of 480 p, 720 p, and 1080 p can be provided by a streaming application according to a speed, the speed guaranteeing 480 p may be the required speed and the speed guaranteeing 720 p or higher may be the preferred speed. When there is the required/preferred bandwidth of the application, the proxy device proceeds to step 503. However, when there is no required/preferred bandwidth of the application, the proxy device proceeds to step 515.

When there is the required/preferred bandwidth of the application, the proxy device determines whether the required/preferred bandwidth is satisfied in step 503. For example, the proxy device identifies whether the required/preferred speed of the application triggering the flow in the current state is satisfied. When the required/preferred bandwidth of the application is satisfied, the proxy device proceeds to step 505. However, when the required/preferred bandwidth of the application is not satisfied, the proxy device proceeds to step 507.

When the required/preferred bandwidth of the application is satisfied, the proxy device may configure the CWND as a value of an amount of transmitted data (bytes-in-flight) at a time point where the speed reaches the required/preferred speed in step 505. The amount of transmitted data means the number of bytes of data of which ACK has not been received among data transmitted by the proxy device at a particular time point. The proxy device may provide the required/preferred speed by configuring, as the CWND, the amount of transmitted data at the time point at which the speed reaches the required/preferred speed.

When the required/preferred bandwidth of the application is not satisfied, the proxy device determines whether the application is sensitive to a delay in step 507. For example, the proxy device additionally identifies whether the application triggering the current flow is sensitive to the delay (for example, a voice/image call, VR, AR, or a game). When the application is sensitive to the delay, the proxy device proceeds to step 509. However, when the application is not sensitive to the delay, the proxy device proceeds to step 513.

When the application is sensitive to the delay, the proxy device configures a threshold as a predefined $Thresh_{sensitive\text{-}tput}$ value in step 509. In this case, since the application is sensitive to the delay while the required/preferred bandwidth of the application is not satisfied, the predefined $Thresh_{sensitive\text{-}tput}$ value may be determined in consideration of both the speed and the delay. According to an embodiment, the $Thresh_{sensitive\text{-}tput}$ value may be determined by an experimental value considering both the speed and the delay.

Thereafter, in step 511, the proxy device may configure the CWND as a value of an amount of transmitted data at a time point at which a speed increase compared to a delay increase reaches the threshold. As described above, the amount of transmitted data means the number of bytes of data of which ACK has not been received among data transmitted by the proxy device at a particular time point. By configuring, as the CWND, the amount of transmitted data at the time point at which the speed reaches the threshold, which is determined in consideration of both the speed and the delay, the proxy device may control data transmission in consideration of trade off between the speed and the delay.

When the application is not sensitive to the delay, the proxy device may configure the CWND as a value of an amount of transmitted data at a time point at which the speed reaches a maximum speed in step 513. This corresponds to the case in which there is the required/preferred bandwidth of the application but the required/preferred bandwidth is not satisfied, and the application is not sensitive to the delay, so that the proxy device may configure the amount of transmitted data at the time point at which the speed is the maximum as the CWND. Accordingly, the proxy device may control data transmission to provide the speed as fast as possible for the application.

When there is no required/preferred bandwidth of the application, the proxy device determines whether the application is sensitive to the delay in step 515. For example, the proxy device additionally identifies whether the application triggering the current flow is sensitive to the delay (for example, a voice/image call, VR, AR, or a game). When the application is sensitive to the delay, the proxy device proceeds to step 517. However, when the application is not sensitive to the delay, the proxy device proceeds to step 519.

When the application is sensitive to the delay, the proxy device configures a threshold as a predefined $Thresh_{sensitive}$ value in step 517. In this case, since there is no required/preferred bandwidth of the application but the application is sensitive to the delay, the predefined $Thresh_{sensitive}$ value may be determined by preferentially considering the delay. According to an embodiment, the $Thresh_{sensitive}$ value may be determined by an experimental value preferentially considering the delay. Thereafter, the proxy device may configure the CWND as a value of an amount of transmitted data at a time point at which a speed increase compared to a delay increase reaches a threshold in step 511. By configuring, as the CWND, the amount of transmitted data at the time point at which the speed reaches the threshold, which is determined by preferentially considering the delay, the proxy device may control data transmission such that the delay is preferentially reduced.

When the application is not sensitive to the delay, the proxy device configures the threshold as a predefined $Thresh_{insensitive}$ value in step 519. In this case, since there is no required/preferred bandwidth of the application and the application is not sensitive to the delay, the predefined $Thresh_{insensitive}$ value may be determined by preferentially considering the speed. However, if the speed is configured to be excessively high, it influences other application flows and thus the speed/delay problem may overall deteriorate. According to an embodiment, the $Thresh_{insensitive}$ value may be determined by an experimental value considering other device/application flows but preferentially the speed. Thereafter, the proxy device may configure the CWND as a value of an amount of transmitted data at a time point at which a speed increase compared to a delay increase reaches a threshold. By configuring, as the CWND, the amount of transmitted data at the time point at which the speed reaches the threshold, which is determined by preferentially considering the speed, the proxy device may control data transmission such that the speed is provided as fast as possible in consideration of another device/application.

According to various embodiments, the $Thresh_{sensitive\text{-}tput}$ value considering only the delay may have the largest value, the $Thresh_{sensitive}$ value considering both the speed and the delay may have a smaller value, and the $Thresh_{insensitive}$ value preferentially considering the speed may be configured as the smallest value.

FIG. 6 illustrates operations of a method of operating a proxy device for controlling a transmission amount threshold parameter based on a network utilization when a loss is generated in a wireless communication system according to various embodiments of the present disclosure. Specifically, the non-limiting example of FIG. 6 illustrates an operation method of the proxy device 110.

Referring to the non-limiting example of FIG. 6, in step 601, the proxy device detects the generation of the loss. According to some embodiments, the proxy device may detect the generation of the Wi-Fi data loss.

Subsequently, in step 603, the proxy device determines whether the network utilization has a value larger than a threshold. According to an embodiment, the proxy device may determine whether a network utilization metric has a value larger than a preset threshold. The network utilization metric may be determined based on at least one of, for example, a sum of speeds of flows, a total number of flows, a total sum of required/preferred speeds of flows having the required/preferred speeds, a sum of speeds of flows except for flows of the device having a loss, a total number of flows except for flows of a device having a loss, a total sum of required/preferred speeds of flows having the required/preferred speeds except for flows of a device having a loss. At this time, the network utilization metric may be determined while excluding the flows of the device having the loss. The generation of the loss in one flow of a particular device means a high possibility of the generation of the loss in other flows of the device, and thus it is required to exclude the network utilization metric in order to improve the network utilization. The preset threshold may be set in advance as an experimental value required to control the CWND to be a level at which the network utilization metric deteriorates the delay. When the network utilization is larger than the threshold, the proxy device proceeds to step 605. When the network utilization is equal to or smaller than the threshold, the proxy device proceeds to step 607.

When the network utilization is larger than the threshold, the proxy device configures the CWND as a $CWND_{Loss}$ value in step 605. According to an embodiment, the proxy device may configure the CWND as the $CWND_{Loss}$ value, which is a smaller value, in order to reduce the CWND. The CWND is a limit of an amount of TCP data which can be transmitted through the network before ACK is received, and thus, as the CWND value is larger, the delay and jitter may deteriorate when the network utilization is large. Accordingly, when the network utilization is larger than the threshold, the delay and jigger may be improved by configuring the CWND value as the $CWND_{Loss}$ value, which is a smaller value. That is, by limiting transmission of the flow having the loss and giving more transmission opportunities to other flows through the CWND value configured as the smaller value, a total network utilization can increase. The $CWND_{Loss}$ value may be preset as an experimental value to improve the data delay.

When the network utilization is equal to or smaller than the threshold, the proxy device configures the CWND as the $CWND_{original}$ value in step 607. According to certain embodiments, the proxy device may maintain the CWND as the original $CWND_{original}$ value. In this case, even though the corresponding flow inefficiently uses the bandwidth through packet retransmission, it does not significantly influence the network utilization. Accordingly, the original CWND value may be maintained in order to prevent a decrease in the speed of the corresponding flow which can be generated by reducing the CWND.

Subsequently, in step 609, the proxy device determines whether the loss is reconstructed. That is, the proxy device determines whether the state in which the data loss is generated is returned to the original state. When it is determined that the loss is reconstructed, the proxy device proceeds to step 611. When it is determined that the loss is not reconstructed, the proxy device determines whether the loss is reconstructed by repeating step 609.

When it is determined that the loss is reconstructed, in step 611, the proxy device configures the CWND as the $CWND_{original}$ value. According to an embodiment, in the state in which the data loss is not generated, a possibility of the generated of the data loss is low, and the proxy device may return the CWND to the original CWND value in order to prevent the decrease in the speed of the corresponding flow which may be generated by reducing the CWND.

According to certain embodiments, when there is a speed difference between both ends of the proxy, the conventional TCP CUBIC method in the TCP proxy environment may deteriorate the delay and jitter since a proxy reception buffer is frequently full. In order to solve the problem, a detailed process for controlling the configuration of the reception amount threshold parameter to reduce the transmission delay according to each network speed difference between both ends of the proxy device proposed by the present disclosure may be performed as illustrated in FIGS. 7 and 8.

Figure 7:
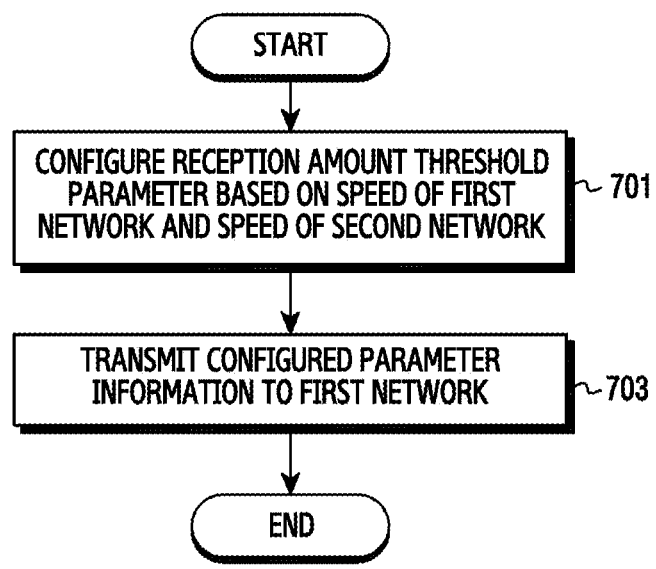
FIG. 7 illustrates operations of a method of operating a proxy device for controlling a reception amount threshold parameter in a communication system according to various embodiments of the present disclosure.
Figure 8:
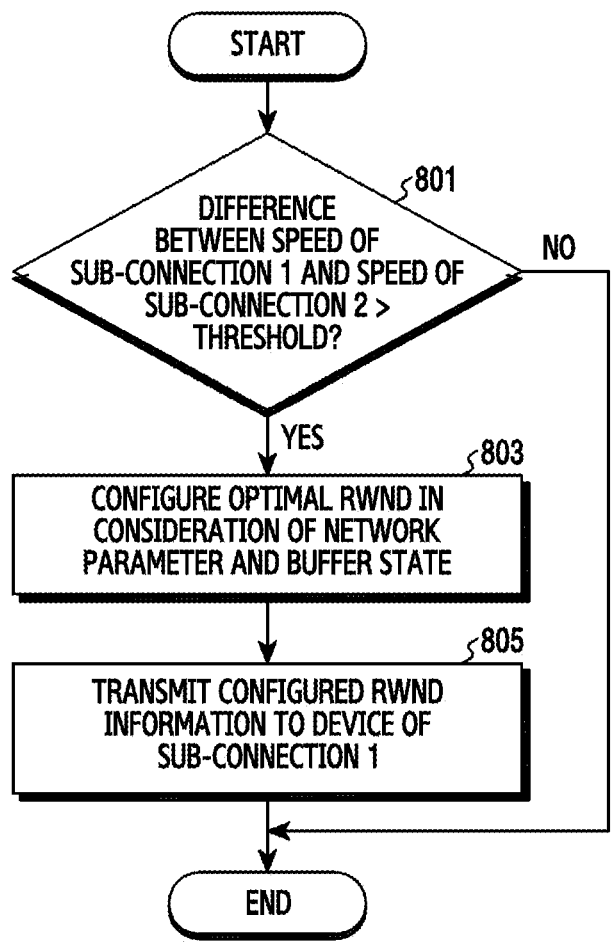
FIG. 8 illustrates operations of a method of operating a proxy device for controlling the reception amount threshold parameter based on a speed difference between sub-connection 1 and sub-connection 2 in a wireless communication system according to various embodiments of the present disclosure.

FIG. 7 illustrates operations of a method of operating the proxy device for controlling a reception amount threshold parameter in the communication system according to various embodiments of the present disclosure. Specifically, the non-limiting example of FIG. 7 illustrates an operational method of the proxy device 110.

Referring to the non-limiting example of FIG. 7, in step 701, the proxy device configures a reception amount threshold parameter based on a first network speed and a second network speed, the first network and the second network being connected to the proxy device. According to an embodiment, the proxy device may determine the reception amount threshold parameter of the proxy device in consideration of a speed difference between the first network and the second network connected to the proxy device. For example, the reception amount threshold parameter may be referred to as a "window" and a value of the reception amount threshold parameter may be referred to as a "window size".

Thereafter, in step 703, the proxy device transmits configured reception amount threshold parameter information to the first network. According to an embodiment, the proxy device may transmit the configured reception amount threshold parameter information of the proxy device to a server device of the first network. Accordingly, the amount of data, which the server device can transmit to the client device, may be controlled by the reception amount threshold parameter of the proxy device.

FIG. 8 illustrates operations of a method of operating the proxy device for controlling the reception amount threshold parameter based on a speed difference between sub-connection 1 and sub-connection 2 in the wireless communication system according to various embodiments of the present disclosure. Specifically, the non-limiting example of FIG. 8 illustrates an operation method of the proxy device 110.

Referring to FIG. 8, in step 801, the proxy device determines whether the speed difference between sub-connection 1 and sub-connection 2 is larger than a threshold. According to certain embodiments, when one connection is divided into sub-connection 1 and sub-connection 2, the proxy device may determine whether the speed difference between sub-connection 1 and sub-connection 2 is larger than a preset threshold. For example, sub-connection 1 may refer to a connection between the first network including the server device (for example, the server 170) and the proxy device, and sub-connection 2 may refer to a connection between the second network including the client device (for example, the IP phone 130, the IP TV 140, or the mobile device 150) and the proxy device. When the speed of sub-connection 1 is higher than the speed of sub-connection 2 by a predetermined value or more, data transmitted from sub-connection 1 may not be sufficiently transferred to sub-connection 2. According to the lapse of time, the buffer of the proxy device may be filled with data from sub-connection 1, and thus the total transmission delay and jitter become larger, so that it is required to control the speed of sub-connection 1 according to the speed of sub-connection 2. When the speed difference between sub-connection 1 and sub-connection 2 is larger than the threshold, the proxy device proceeds to step 803. When the speed difference between sub-connection 1 and sub-connection 2 is equal to or smaller than the threshold, the proxy device proceeds to step 805.

When the speed difference between sub-connection 1 and sub-connection 2 is larger than the threshold, the proxy device configures an optimal RWND value in consideration of a network parameter and a buffer state. For example, the network parameter may include the speed of sub-connection 1, the speed of sub-connection 2, RTT, and a loss rate. According to certain embodiments, the optimal RWND may be configured as a smaller value between the RWND considering the buffer state and the RWND considering the network parameter including the speed. The optimal RWND value may have a byte unit and may be calculated through Equation (1).

$$RWND_{Optimum} = \min(RWND_{Throughput}, RWND_{Buffer}) \quad \text{Equation (1)}$$

In Equation (1), $RWND_{Buffer}$ denotes an RWND considering the buffer state, which is a value obtained through the conventional RWND configuring method. $RWND_{Throughput}$ denotes an RWND considering the network parameter including the speed, which is a value obtained through the method proposed by the present disclosure. According to an embodiment, the $RWND_{Throughput}$ may be calculated through Equation (2).

$$RWND_{Throughput} = \frac{T_{subconnection\ 2} \times RTT \times \sqrt{p}}{8 \times C} \quad \text{Equation (2)}$$

In Equation (2), $RWND_{Throughput}$ denotes an RWND value considering the network parameter including the speed. $T_{subconnection\ 2}$ denotes throughput of sub-connection 2 and a unit thereof is bps (bit/sec). RTT denotes a response delay time and a unit thereof is seconds (sec). P denotes a packet loss rate, and C is a constant and may be defined as 0.93. Equation (2) and the constant are experimentally determined, and other values may be configured according to various embodiments.

As described above, the optimal RWND value may be determined as the smaller value between $RWND_{Buffer}$ considering the buffer and $RWND_{Throughput}$ considering the network parameter including the speed. By configuring the RWND as a smaller value in consideration of the speed and delay of sub-connection 2 rather than the amount of data which can be received by the buffer size, the server of sub-connection 1 may transmit an amount of data, which is smaller than an amount of data, which the client of sub-connection 2 can actually receive, thereby reducing the delay and jitter.

After configuring the optimal RWND, the proxy device proceeds to step 805.

When the speed difference between sub-connection 1 and sub-connection 2 is equal to or smaller than the threshold, the proxy device transmits RWND information to the device of sub-connection 1. For example, when it is determined that the speed difference is equal to or smaller than the threshold in step 801, the proxy device may transmit the RWND value configured in consideration of the buffer state of the proxy device through the conventional method or optimal RWND information configured in step 803 to the device of sub-connection 1. At this time, the device of sub-connection 1 is the server device, and the device of sub-connection 2 is the client device. Conversely, when the device of sub-connection 2 operates as the server and the device of sub-connection 1 operates as the client device, the proxy device may transmit the configured RWND to sub-connection 2 in consideration of reception buffer of the proxy device. As sub-connection 1 receiving the configured RWND information transmits data based on the received information, it is possible to control an amount of data which the proxy device receives and transmits.

As described above, there is the difference between the conventional TCP proxy method and the method proposed by the present disclosure, and the detailed performance difference therebetween may be illustrated in FIGS. 9A to 10B.

Figure 9A:
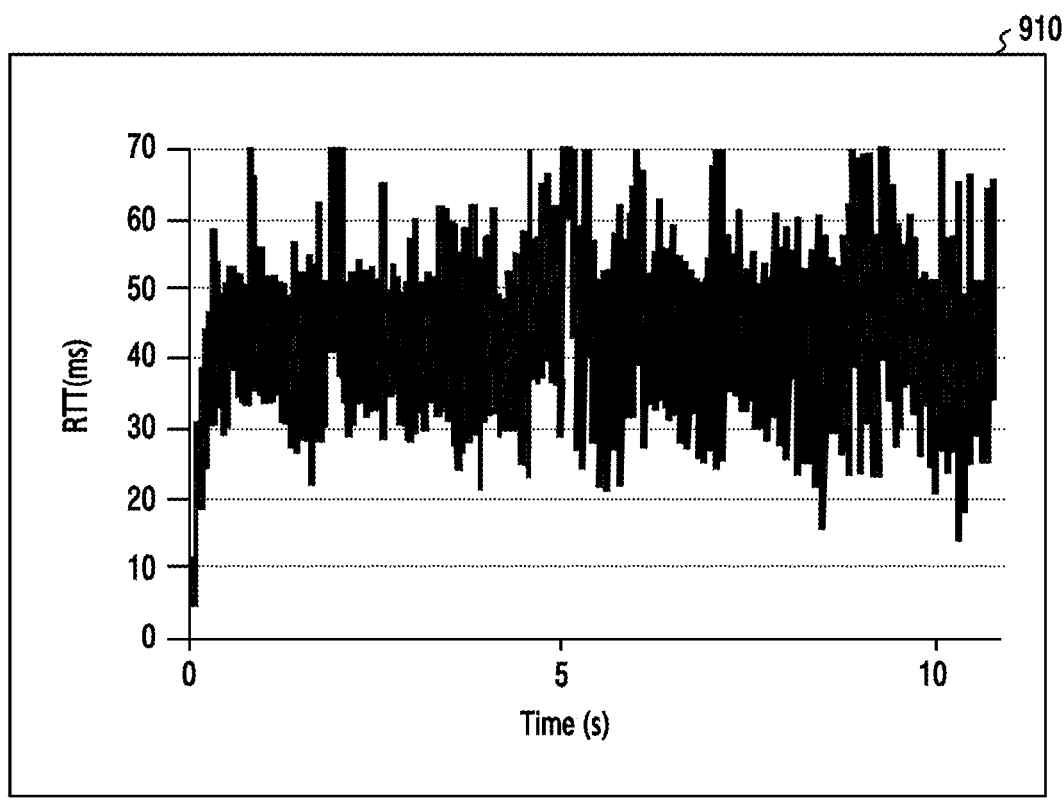
FIG. 9A is a graph illustrating a data transmission delay when a CWND value is fixed in a wireless communication system according to various embodiments of the present disclosure.
Figure 9B:
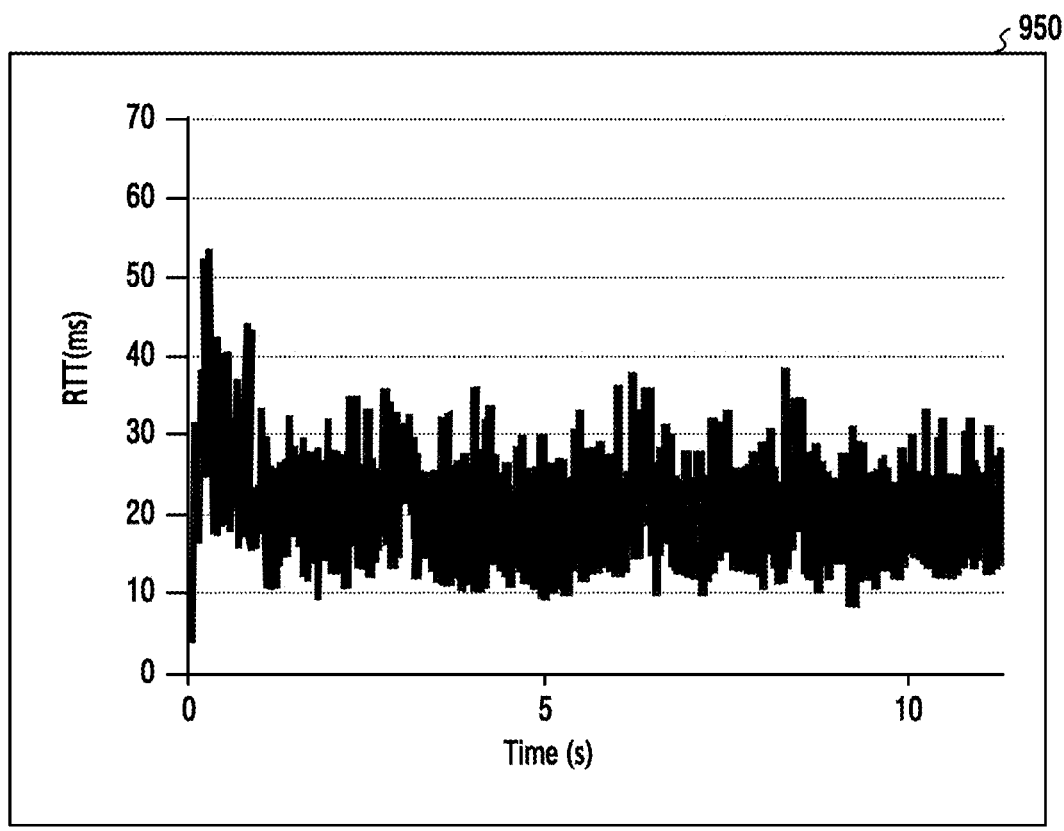
FIG. 9B is a graph illustrating a data transmission delay when a CWND value is reduced in a wireless communication system according to various embodiments of the present disclosure.

FIGS. 9A and 9B are graphs 910 and 950 illustrating data transmission delays when the CWND value is fixed and the CWND value is reduced in the wireless communication system according to various embodiments of the present disclosure.

Referring to FIG. 9A, when the conventional CWND is configured for an application (for example, a cloud storage application such as Dropbox or a file sharing application such as Torrent) which is not sensitive to the delay, a change in an RTT value according to a speed and a time is illustrated. According to an embodiment, the speed is 128 Mbps that is relatively fast, but average RTT according to the speed may be around 45 and a dynamic range is relatively wide. When a small CWND value is configured, the delay of the application which is not sensitive to the delay is improved but the speed thereof is reduced, and thus the QoE of the user decreases. Accordingly, by maintaining the CWND value to provide a higher speed, the application which is not sensitive to the delay may improve the QoE of the user.

Referring to FIG. 9B, when the low CWND is configured to the application sensitive to the delay, a change in an RTT value according to the speed and the time is illustrated. According to an embodiment, the speed is lowered to 110 Mbps, but average RTT according to the speed may be around 20 and a dynamic range is relatively narrow. When the high CWND value is configured, the application sensitive to the delay reduces the QoE of the user since the delay becomes larger. Particularly, an application which does not require a fast speed but is sensitive to the delay (for example, VR, AR, or a game application) suffers a great loss without any gain of speed improvement according to the configuration of the high CWND value. Accordingly, by configuring the CWND value to be small to provide a low delay, the application which is not sensitive to the delay may improve the QoE of the user.

Figure 10A:
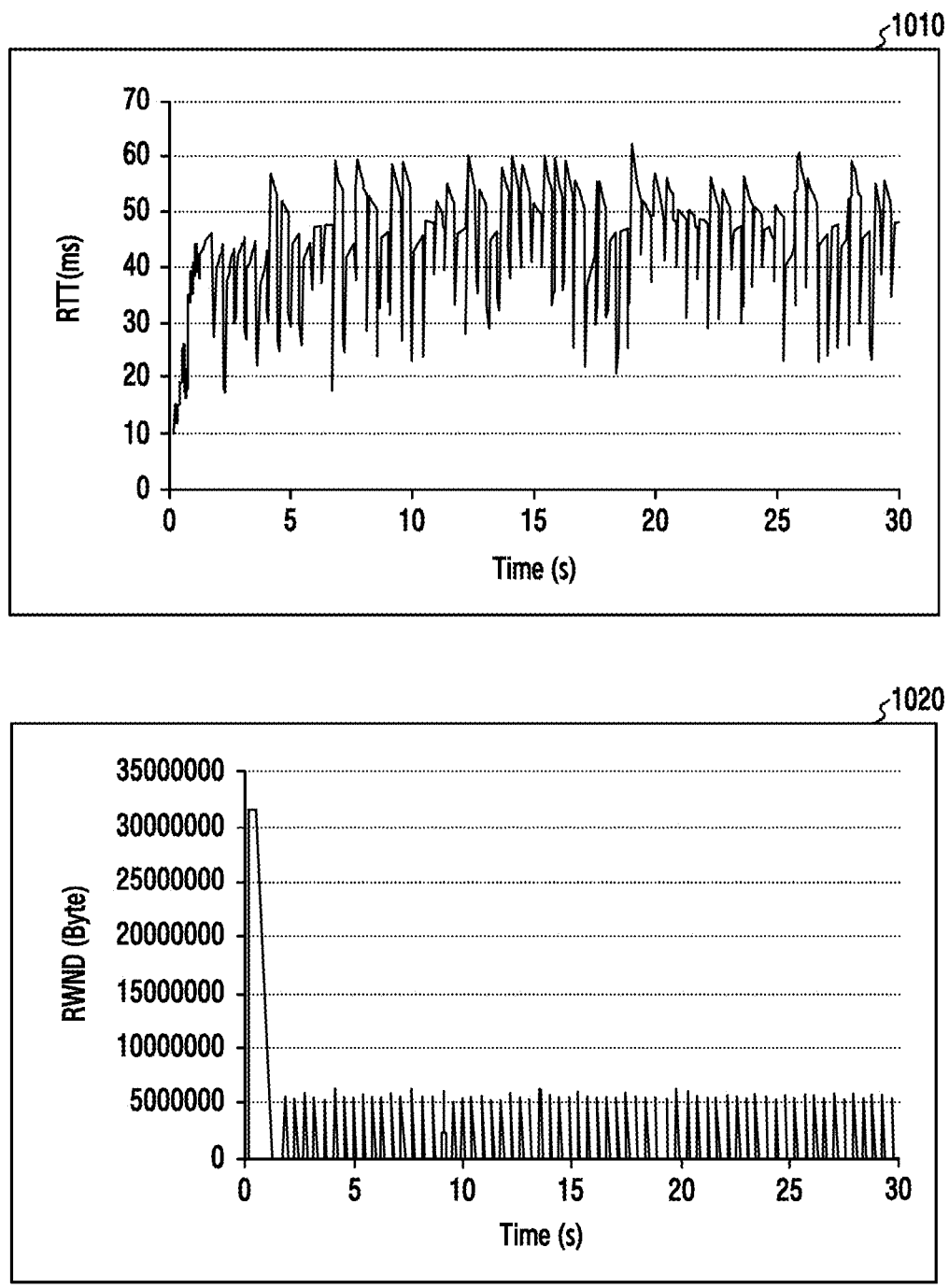
FIG. 10A is a graph illustrating a data transmission delay based on RWND control through the conventional method in a wireless communication system according to various embodiments of the present disclosure.
Figure 10B:
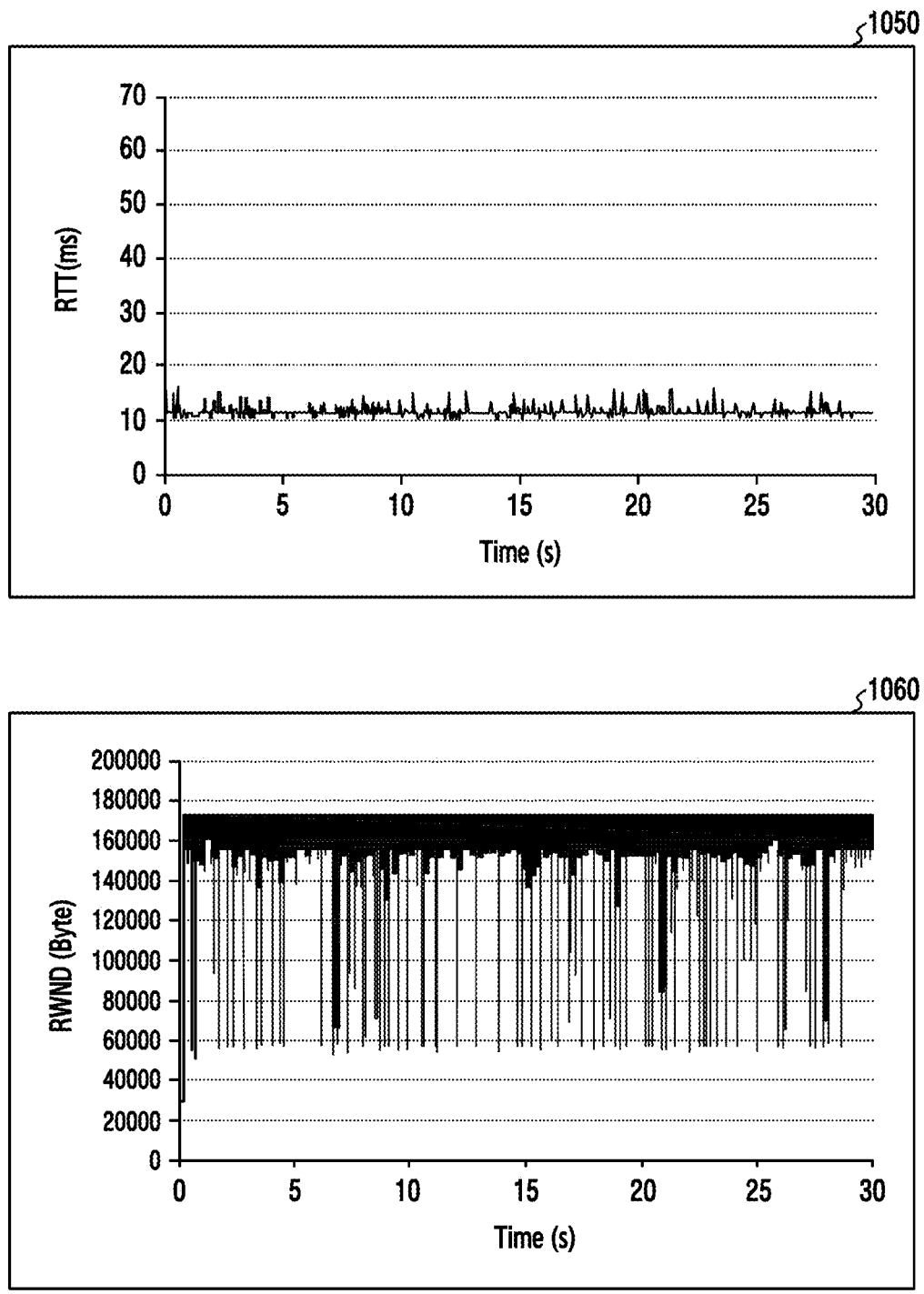
FIG. 10B is a graph illustrating a data transmission delay based on RWND control in consideration of a speed difference between both ends of a proxy device in a wireless communication system according to various embodiments of the present disclosure.

FIGS. 10A and 10B are graphs illustrating a data transmission delay based on RWND control through the conventional method and RWND control considering the speed difference between both ends of the proxy device in the wireless communication system according to various embodiments of the present disclosure. According to an embodiment, when the connection is divided into sub-connection 1 including servers of both ends of the TCP proxy and sub-connection 2 including a client, the speed of sub-connection 1 may be 500 Mbps, and the speed of sub-connection 2 may be 120 Mbps.

Referring to the non-limiting example of FIG. 10A, when the RWND is configured in consideration only with the buffer state without consideration of the speed difference between both ends of the proxy device, a graph 1010 showing an RTT value according to the time and a graph 1020 showing a change in the RWND according to the time are illustrated. When the RWND is configured in consideration only with the buffer state, the RTT value significantly fluctuates around 40 as in the graph 1010 and the RWND significantly fluctuates between 0 and 50 MB (megabytes) as in the graph 1020. Since the speed of sub-connection 1 is higher than the speed of sub-connection 2, data transmitted from sub-connection 1 may not be sufficiently transferred to sub-connection 2. Even though there is a time difference according to the size of the buffer of the proxy device, the buffer is filled with data from sub-connection 1, and accordingly, the total transmission delay and jitter increase.

However, referring to the non-limiting example of FIG. 10B, when the RWND is configured in consideration of the speed difference between both ends of the proxy device, a graph 1050 showing an RTT value according to the time and a graph 1060 showing a change in the RWND according to the time are illustrated. When the RWND is configured in consideration of the speed difference between both ends of the proxy, the RTT value gently fluctuates around 10 as in the graph 1050 and the RWND remains at a level of 170 KB (kilobytes) as in the graph 1060. When the speed at which sub-connection 1 performs transmission to the proxy device becomes similar to the speed of sub-connection 2 by configuring the RWND in consideration of the speed of sub-connection 2, the RTT, and the transmission delay rate, it is possible to significantly reduce the transmission delay and jitter without the decrease in the speed (throughput is uniform at a level of 120 Mbps).

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other types of optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a proxy device in a communication system, the method comprising:
    determining whether a difference between a first speed of a first connection between a first device and the proxy device and a second speed of a second connection between a second device and the proxy device is larger than a first threshold;
    determine a first threshold parameter according to the determination, wherein the first threshold parameter comprises a receiver window (RWND); and
    determining a second threshold parameter for a data transmission or a data reception, wherein the determining the second threshold parameter comprises determining a congestion window (CWND) based on at least one of whether an application is sensitive to a delay or not and a network utilization; and
    performing the data transmission and the data reception based on the first threshold parameter and the second threshold parameter.

2. The method of claim 1, wherein determining the CWND comprises:
    determining whether there is a required bandwidth or a preferred bandwidth of the application;
    determining whether the application is sensitive to a delay according to a result of the determination whether there is the required bandwidth or the preferred bandwidth of the application;
    determining a second threshold as a preset value based on the determination result of whether the application is sensitive to the delay; and
    determining the CWND based on the second threshold.

3. The method of claim 2, wherein determining the second threshold comprises determining the second threshold in consideration of a data transmission delay for the application if it is determined that the application is sensitive to the delay.

4. The method of claim 1, wherein determining the CWND comprises:
    detecting a data loss;
    determining whether the network utilization is larger than a third threshold according to the detection of the data loss; and
    determining the CWND according to the determination.

5. The method of claim 4, wherein determining the CWND according to the determination whether the network utilization is larger than the third threshold according to the detection of the data loss comprises:
    determining the CWND to be smaller than before if it is determined that the network utilization is larger than the third threshold; and
    determining the CWND to be equal to before if it is determined that the network utilization is equal to or smaller than the third threshold.

6. The method of claim 1, wherein determining the RWND comprises, if it is determined that the difference is larger than the first threshold, determining the RWND in consideration of the second speed and a buffer state.

7. A proxy device in a communication system, the proxy device comprising:
    at least one processor configured to:
        determine whether a difference between a first speed of a first connection between a first device and the proxy device and a second speed of a second connection between a second device and the proxy device is larger than a first threshold;

determine a first threshold parameter according to the determination, wherein the first threshold parameter comprises a receiver window (RWND);

determine a second threshold parameter for a data transmission or a data reception, based on at least one of whether an application is sensitive to a delay or not and a network utilization, wherein the second threshold parameter comprises a congestion window (CWND); and perform the data transmission and the data reception based on the first threshold parameter and the second threshold parameter.

8. The proxy device of claim 7, wherein the at least one processor is further configured to:

determine whether there is a required bandwidth or preferred bandwidth of the application, determines whether the application is sensitive to a delay according to a result of the determination whether there is the required bandwidth or the preferred bandwidth of the application;

determine a second threshold as a preset value based on the determination result of whether the application is sensitive to the delay; and determine the CWND based on the first threshold parameter.

9. The proxy device of claim 8, wherein the at least one processor is configured to:

determine the second threshold in consideration of a data transmission delay for the application if it is determined that the application is sensitive to the delay.

10. The proxy device of claim 7, wherein the at least one processor is configured to:

detect a data loss;

determine whether the network utilization is larger than a third threshold according to the detection of the data loss; and determine the CWND according to a result of the determination whether the network utilization is larger than the third threshold.

11. The proxy device of claim 10, wherein the at least one processor is configured to:

determine the CWND to be smaller than before if it is determined that the network utilization is larger than the third threshold, and determine the CWND to be equal to before if it is determined that the network utilization is equal to or smaller than the third threshold.

12. The proxy device of claim 7, wherein the at least one processor is configured to:

determine the RWND in consideration of second speed and a buffer state if it is determined that the difference is larger than the first threshold parameter.

* * * * *